United States Patent [19]

Juen

[11] Patent Number: 4,924,313
[45] Date of Patent: May 8, 1990

[54] STILL PICTURE SIGNAL PROCESSING APPARATUS HAVING HIGH RESOLUTION IMAGE PICKUP DEVICE WITH 4-TO-1 INTERLACE

[75] Inventor: Masahiro Juen, Tokyo, Japan
[73] Assignee: Nikon Corporation, Tokyo, Japan
[21] Appl. No.: 396,802
[22] Filed: Aug. 21, 1989

Related U.S. Application Data

[63] Continuation of Ser. No. 314,228, Feb. 22, 1989, abandoned, which is a continuation of Ser. No. 153,709, Feb. 8, 1988, abandoned.

[30] Foreign Application Priority Data

Feb. 13, 1987 [JP] Japan .................................. 62-30876

[51] Int. Cl.$^5$ ........................ H04N 7/12; H04N 7/01; H04N 9/79
[52] U.S. Cl. .................... 358/140; 358/138; 358/313
[58] Field of Search ........................ 358/11, 12, 18, 93, 358/138, 140, 141, 213.22, 213.26, 213.28, 313, 335, 337, 346; 360/9.1, 33.1, 135

[56] References Cited

U.S. PATENT DOCUMENTS

| | | | |
|---|---|---|---|
| 2,810,780 | 10/1957 | Loughlin | 358/138 |
| 2,892,015 | 6/1959 | Jones | 358/15 |
| 2,921,124 | 1/1960 | Graham | 358/138 |
| 4,047,204 | 9/1977 | Gold | 358/93 |
| 4,168,509 | 9/1979 | Hartmann | 358/138 |
| 4,389,668 | 6/1983 | Favreau | 358/140 |
| 4,675,733 | 6/1987 | Tamimoto | 358/138 |
| 4,707,728 | 11/1987 | Hurst | 358/141 |
| 4,819,059 | 4/1989 | Pape | 358/12 |

Primary Examiner—John K. Peng
Attorney, Agent, or Firm—Shaprio and Shaprio

[57] ABSTRACT

A signal processing system for an image pickup device is so structured that an image pickup device having vertical effective pixels double the number of effective scan lines of broadcast television is horizontally scanned at a horizontal scan frequency of the broadcast television with 4-to-1 interlace. One scan period is sampled with a number that is half samples of the number of effective horizontal pixels. The scan lines are read in such a sequence that, in a first field, one quarter of the total scan lines are read with jumping of three scan lines, in a second field, the scan lines corresponding to intermediate ones of three scan lines jumped in the first field are read, in a third field, the scan lines between the scan lines read in the first field and the scan lines read in the second field are read, and in a fourth field, the remaining scan lines are read.

11 Claims, 9 Drawing Sheets

|  |  | m | | m+1 | |
|---|---|---|---|---|---|
| $A_n$ ---- R — Y | | Ye | Mg | Cy | G |
| $B_n$ ---- B — Y | | Ye | G | Cy | Mg |
| $C_n$ ---- R — Y | | Ye | Mg | Cy | G |
| $D_n$ ---- B — Y | | Ye | G | Cy | Mg |
| $A_{n+1}$ ---- B — Y | | Ye | G | Cy | Mg |
| $B_{n+1}$ ---- R — Y | | Ye | Mg | Cy | G |
| $C_{n+1}$ ---- B — Y | | Ye | G | Cy | Mg |
| $D_{n+1}$ ---- R — Y | | Ye | Mg | Cy | G |

STILL PICTURE SIGNAL PROCESSING APPARATUS HAVING HIGH RESOLUTION IMAGE PICKUP DEVICE WITH 4-TO-1 INTERLACE

This is a continuation application of Ser. No. 314,228 filed Feb. 22, 1989, which is a continuation application of Ser. No. 153,709 filed Feb. 8, 1988, both of which are now abandoned.

BACKGROUND OF THE INVENTION

1. Field of the Invention

The present invention relates to a signal processing system of an image pickup device which reads an image signal from a high resolution image pickup device in a form compatible to a broadcast television signal system to permit monitoring, recording and reproducing a still image.

2. Related Background Art

A conventional solid-state image pickup device such as a CCD usually has several hundred thousands effective pixels. With a solid-state image pickup device having such a number of pixels, the device is read with sampling at a horizontal scan frequency of broadcast television with 2-to-1 interlace. Accordingly, the signal can be reproduced as it is on a general purpose television monitor and recorded onto a VTR or a floppy disk developed for an electronic still camera.

Recently, a high resolution image pickup device (approximately 1,200,000 pixels) having vertical effective pixels double the number of effective horizontal scan lines of broadcast television has been put into practical use. In the signal processing of such a high resolution image pickup device, if the 2-to-1 interlace system is used, a image pickup device is read at the horizontal scan frequency double the horizontal scan frequency of the broadcast television. As a result, the number of horizontal scan lines is different from that of the existing broadcast television system, and the output image must be watched by a special television monitor which is compatible to the drive system of the high resolution image pickup device. A special equipment is also required to record and reproduce the image signal.

Since the signal processing system of a high resolution image pickup element which is not compatible to the existing broadcast television signal system requires special monitor and recording/reproducing apparatus, the circuit configuration is complex, the apparatus is bulky, and the cost increases. Accordingly, it has been difficult to conveniently use the high resolution image pickup device.

SUMMARY OF THE INVENTION

It is an object of the present invention to provide a signal processing apparatus which allows the use of a general purpose television monitor employing the current broadcast television signal system even for a high resolution image pickup device, allows recording of a still image onto a VTR or a floppy disk of an electronic still camera, and assures a high resolution still image through reproduction of the recorded image.

In order to achieve the above object, in accordance with the present invention, an image pickup device having vertical effective pixels double the number of effective scan lines of the broadcast television is horizontally scanned at a horizontal scan frequency of the broadcast television with 4-to-1 interlace. One scan period is sampled with half the number of samples of the number of effective horizontal pixels. The scan lines are read in such a sequence that, in a first field, one quarter of the total scan lines are read with jumping of three scan lines, in a second field, the scan lines corresponding to intermediate ones of three scan lines jumped in the first field are read, in a third field, the scan lines between the scan lines read in the first field and the scan lines read in the second field are read, and in a fourth field, the remaining scan lines are read.

DESCRIPTION OF THE PREFERRED EMBODIMENTS

Figure 1:
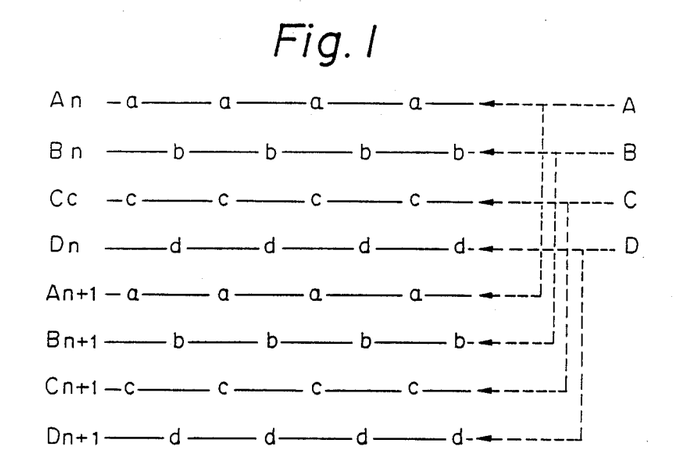
FIG. 1 illustrates reading of a solid-state image pickup device by a 4-to-1 interlace and sampling points of scan lines.

FIG. 1 illustrates a principle of image reading by the present invention which is applicable to a high resolution image pickup device having vertical effective pixels double the number of effective scan lines of broadcast television.

FIG. 1 shows a scan sequence of an image pickup screen (effective image pickup screen) of the image pickup device and sampling points after it has been read.

In the present invention, the image pickup device has vertical effective pixels double the number of vertical effective pixels of a conventional television. The image pickup device is interlaced with 4-to-1 so that one screen is constructed by four fields A, B, C and D.

In a first field, a field A shown by scan lines $A_n$ and $A_{n+1}$ (where n is an integer) is read at a horizontal scan frequency of the conventional television. For the signal read in the field A, the scan line $A_n$ is sampled at points a and the scan line $A_{n+1}$ is sampled at points a which are at the same horizontal positions as those of the scan line $A_n$. The sampling frequency is equal to one half of the frequency for sampling horizontal effective pixels of the high resolution image pickup device.

In the first field, one quarter of the total scan lines are sequentially read with jumping of three scan lines.

By processing the signal read for the field A in the same manner as that for a conventional television camera, it may be handled as a signal having the field image scan speed and signal band of conventional television.

In a second field, a field C shown by scan lines $C_n$ and $C_{n+1}$ is scanned. The scan line $C_n$ is sampled at points c and the scan line $C_n$ is sampled at the same points c. Thus, in the second field, the scan lines which are intermediate ones of the three scan lines jumped in the first field (field A) are sequentially read.

The signals of the fields A and C read in the first and second fields may be handled as if they were a first frame of the conventional 2-to-1 interlace television signal, and they can be monitored by a conventional television.

In a third field, a field B shown by scan lines $B_n$ and $B_{n+1}$ is read. After reading, they are sampled at sampling points b which are of opposite phase to the sampling points a of the field A. In the third field, the scan lines between the first field (field A) and the second field (field C) are sequentially read.

In a fourth field, a field D shown by scan lines $D_n$ and $D_{n+1}$ is read. After reading, they are sampled at sampling points d which are of opposite phase to the sampling points c of the second field or the field C.

As a result, the fields B and D can be handled as if they were one frame of the conventional 2-to-1 interlace television signal and they can be monitored by the conventional television monitor as the fields A and C can be monitored.

By interpolating missing sample points on the scan lines of the fields A, B, C and D by spatially upper or lower samples, an image of high resolution, both vertically and horizontally, is produced by the readout of the image pickup device with the 4-to-1 interlace shown in FIG. 1.

Figure 2:
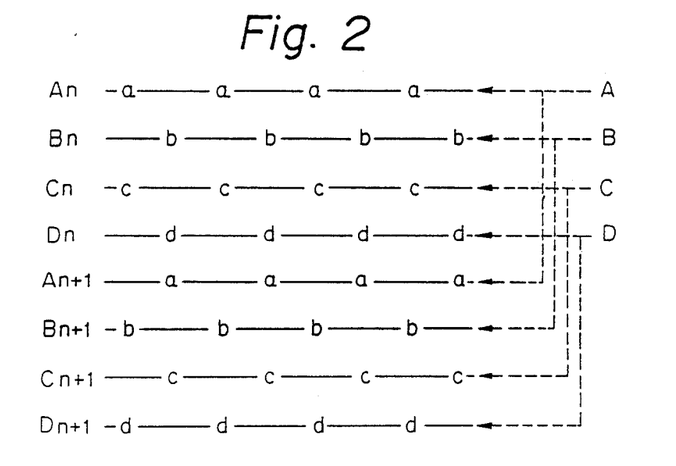
FIG. 2 illustrates reading of a solid-state image pickup device by a 4-to-1 interlace and sampling points.

FIG. 2 illustrates another sampling system to be performed after reading of the image pickup device by the 4-to-1 interlace in accordance with the present invention. In the embodiment of FIG. 2, as seen from comparison with FIG. 1, the sampling points of successive horizontal scan lines are phase-reversed in each of the fields A, B, C and D. For example, for the field A comprising the scan lines $A_n$ and $A_{n+1}$, the sample points a of the scan line $A_{n+1}$ are 180° shifted from the sampling points a of the scan line $A_n$. This is also true for the scan lines $B_n$ and $B_{n+1}$ of the field B, the scan lines $C_n$ and $C_{n+1}$ of the field C, and the scan lines $D_n$ and $D_{n+1}$ of the field D.

Figure 3:
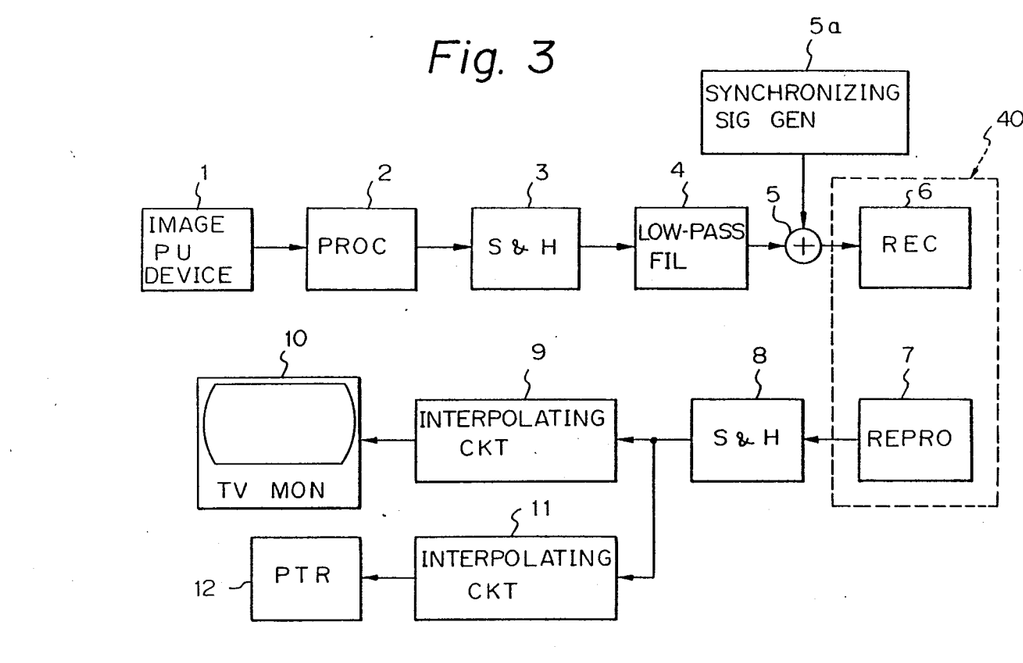
FIG. 3 shows a block diagram of one embodiment of the present invention applied to recording and reproducing of a monochromatic television signal.

FIG. 3 shows a block diagram of one embodiment of the present invention which records and reproduces a monochromatic television signal read from the image pickup device.

In FIG. 3, numeral 1 denotes an image pickup device which has vertical effective pixels double the number of horizontal effective scan lines of a conventional television, and a sufficiently large number of horizontal pixels. The image pickup device 1 is scanned with the 4-to-1 interlace shown in FIGS. 1 and 2 and produces video signals for each of four fields.

Numeral 2 denotes a processing circuit which is identical to that used for a conventional television camera. It has a sufficient frequency characteristic and applies signal processings such as gamma correction and white clipping to the output of the image pickup device.

Numeral 3 denotes a sample and hold circuit for band compression. It samples and holds the output of the processing circuit 2 as shown by the sampling points of FIGS. 1 and 2.

Numeral 4 denotes a low-pass filter which limits the video signal to a frequency band determined by the sample/hold frequency. Numeral 5 denotes a synchronization circuit which adds horizontal and vertical synchronization signals of the 2-to-1 interlace of the conventional television supplied from a synchronization signal generator 5a to the video signal supplied from the low-pass filter 4. Thus, the output of the synchronization signal 5 can be handled as a composite video signal of the conventional television.

Numeral 40 denotes a record/reproduce unit which may be one used in a conventional VTR or for a floppy disk used in an electronic still camera. The record/reproduce unit 40 has a record unit 6 and a reproduce unit 7. The composite video signal having the synchronization signal added thereto by the synchronization circuit 5 is supplied to the record unit 6 of the record/reproduce unit 40. The record unit 6 records two frames (four fields) of the conventional television signal. Similarly, the reproduce unit 7 reproduces two frames (four fields) of recorded conventional television signal.

A sample and hold circuit 8 samples and holds the signal reproduced by the reproduce unit 7. A sample/hold pulse therefor has the same phase as the sample/hold pulse used for the sample and hold circuit 3. Numeral 9 denotes an interpolation circuit which interpolates pixels between scan lines in one field. Numeral 10 denotes a conventional television monitor.

The output of the sample and hold circuit 8 is supplied to a pixel interpolation circuit 11 which interpolates missing sample points, shown in FIG. 1, for example, by using four fields of reproduced signal supplied by the sample and hold circuit 8. The output signal of the pixel interpolation circuit 11 has vertical resolution power double that of a conventional signal, and horizontal resolution power is high enough to cover the sampling frequency. Numeral 12 denotes a printer for printing the output of the pixel interpolation circuit 11 which interpolates pixels among four fields. It produces a high quality print-out image.

Figure 4:
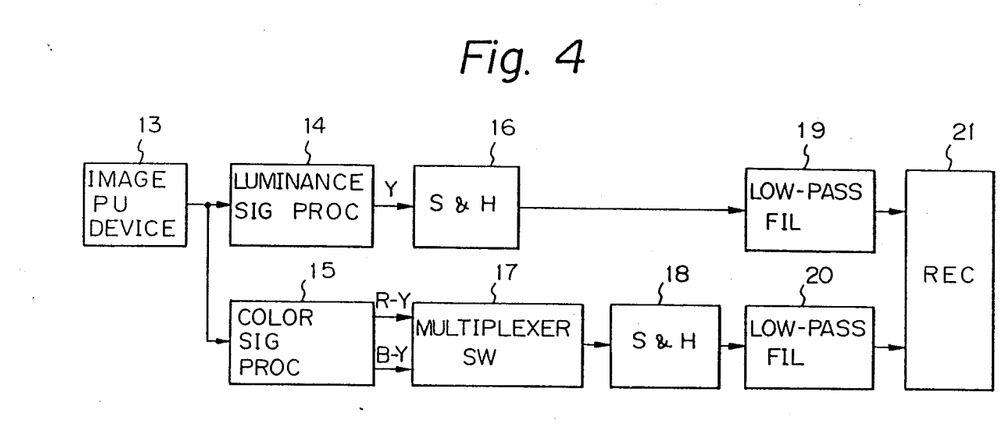
FIG. 4 shows a block diagram of another embodiment of the present invention applied to recording and reproducing of a color television signal.

FIG. 4 shows a block diagram of another embodiment of the present invention. The present embodiment records and reproduces a color television signal and uses a still video floppy disk as a record medium.

The operation of the embodiment of FIG. 4 will now be explained. Numeral 13 denotes an image pickup device which is similar to the image pickup device 1 of FIG. 3 and adapted for color television.

Numeral 14 denotes a processing circuit for a luminance signal, and numeral 15 denotes a processing circuit for a chrominance signal. They perform the same signal processing as the processing circuits of the conventional color television camera. The luminance signal processing circuit 14 produces a luminance signal Y, and the chrominance signal processing circuit 15 produces color differential signals (R - Y) and (B - Y).

The luminance signal Y produced by the luminance signal processing circuit 14 is band-compressed by sampling of a sample and hold circuit 16 which is similar to that used in the embodiment of FIG. 3, and band-controlled by a low-pass filter 19, and recorded to a still video floppy disk by a record circuit 21. On the other hand, the color differential signals (R - Y) and (B - Y) from the chrominance signal processing circuit 15 are line-sequenced by a multiplexer switching circuit 17. The line-sequencing of the color differential signals by the multiplexer switching circuit 17 is done in such a sequence that the signals (R - Y) and (B - Y) are alternately produced in one field, as shown by scan lines $A_n$, $A_{n+1}$, $B_n$, $B_{n+1}$, $C_n$, $C_{n+1}$, $D_n$ and $D_{n+1}$ of FIG. 6, and the sequence of line-sequencing is reversed between the first two fields ($A_n$, $A_{n+1}$ of the first field and $C_n$, $C_{n+1}$ of the second field) and the second two fields ($B_n$, $B_{n+1}$ of the third field and $D_n$, $D_{n+1}$ of the fourth field).

By such line sequencing, the chrominance signal can be reproduced even in one field and the interpolated reproduction of the chrominance signals in four fields (one screen) can be done smoothly.

Figure 6:
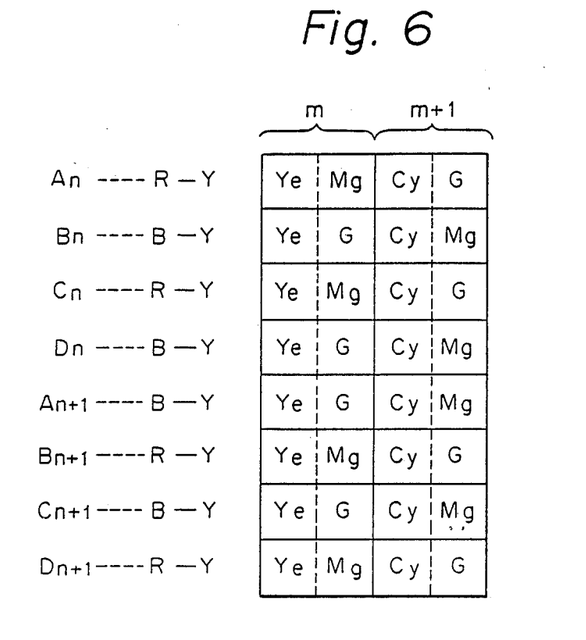
FIG. 6 shows an example of a single plate coloring filter consisting of a repetition of filters for a horizontal m-th pixel and (m+1)th pixel (where m is a positive integer).

Referring again to FIG. 4, the output of the multiplexer switching circuit 17 which performs the line-sequencing of the chrominance signals shown in FIG. 6 is sampled by a sample and hold circuit 18 so that it is band-compressed. The chrominance signals are band-limited by a low-pass filter 20 and recorded on the still video floppy by a still video floppy record circuit 21.

The sampling frequencies of the sample and hold circuits 16 and 18 are set such that a record band frequency to the still video floppy disk is a Nyquist frequency. The sampling phases thereof maintain the relationship of the sampling points shown in FIGS. 1 or 2.

Figure 5:
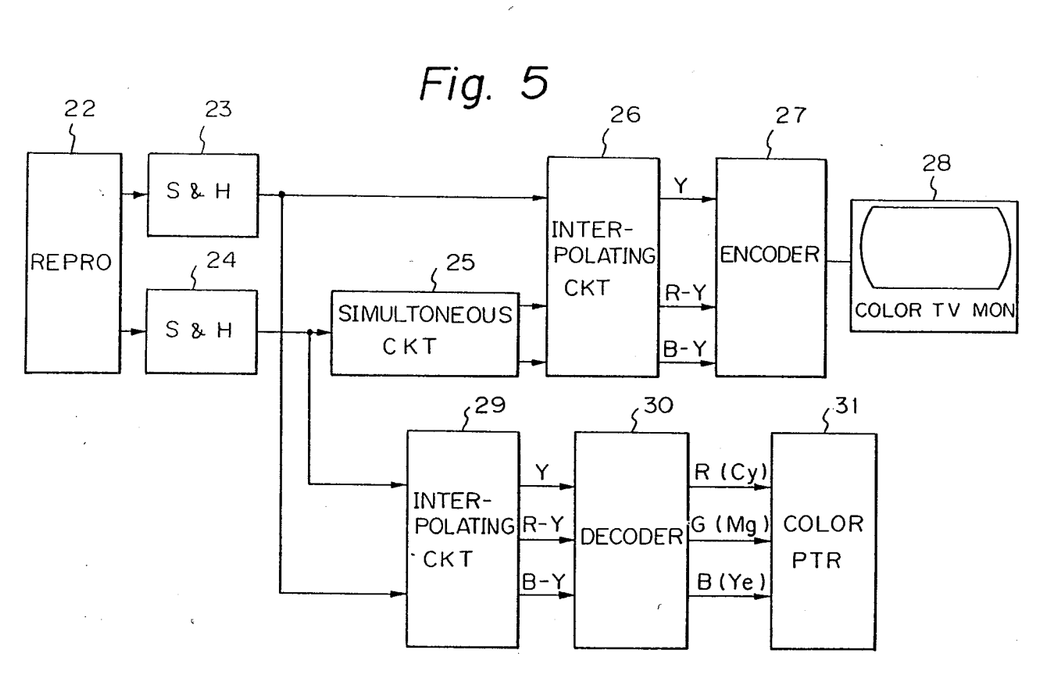
FIG. 5 shows an arrangement of a single coloring filter for effecting line-sequencing of color differential signals by an image pickup device.

A reproducing circuit for the still video floppy of FIG. 5 will now be explained. Numeral 22 denotes a still video floppy reproducing circuit. A luminance signal reproduced by the still video floppy reproducing circuit 22 is supplied to a sample and hold circuit 23, and chrominance signals are supplied to a sample and hold circuit 24. The sample and hold circuits 23 and 24 sample and hold the reproduced luminance signal and chrominance signals with the same phases as those of the sample and hold circuits 16 and 18 of the recording circuit.

In order to watch the reproduced signal by the television monitor, the color differential signals (R - Y) and (B - Y) produced by the sample and hold circuit 24 are made simultaneous by a simultization circuit 25, and the luminance signal Y from the sample and hold circuit 23 and the color differential signals (R - Y) and (B - Y) made simultaneous by the simultization circuit 25 are supplied to a pixel interpolation circuit 26 which interpolates pixels in one field. It is converted to a composite video signal of a standard color television by an encoder 27 so that the image is reproduced by a color television monitor 28.

When a high resolution printer image is to be produced from the signal reproduced from the still video floppy, the luminance signal Y from the sample and hold circuit 23 and the color differential signals (R - Y) and (B - Y) from the sample and hold circuit 24 are supplied to a pixel interpolation circuit 29. A decoder 30 decodes the pixel-interpolated luminance signal Y and color differential signals (R - Y) and (B - Y) to three primary color signals R, G and B or three complementary color signals, cyan, magenta and yellow, and a black signal, which are printed out by a color printer 31.

The pixel interpolation among four fields by the pixel interpolation circuit 29 does not need a separate field memory for the pixel interpolation because the video floppy disk functions as the field memory.

When a solid-state image pickup device having a single plate coloring filter for multiplexing line-sequential color differential signals in place of the line sequencing color differential signal processing by the mulitplexer switching circuit 17 is used as the image pickup element 13 in the embodiment of FIG. 4, the apparatus of FIG. 4 is very much simplified.

The single plate coloring filter for that purpose may be repetition of filters for a horizontal m-th pixel and (m+1)th pixel (where m is a positive integer), as shown in FIG. 6. Ye denotes a yellow transmissive filter, Mg denotes a magenta transmissive filter, Cy denotes a cyan transmissive filter, and G denotes a green transmissive filter. A split filter having two of the four color filters combined is provided for each pixel so that the chrominance signals produced by the readout of the image pickup device 13 by the 4-to-1 interlace include the line-sequenced chrominance signals.

Figure 7:
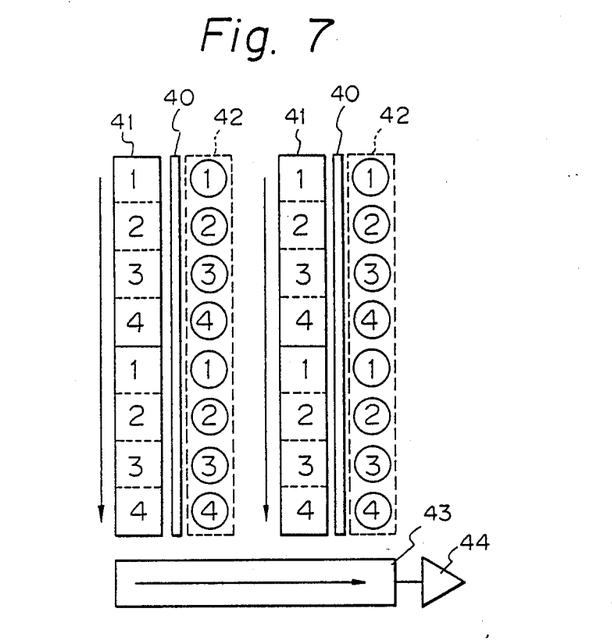
FIG. 7 shows a solid-state image pickup device used in the present invention.
Figure 8:
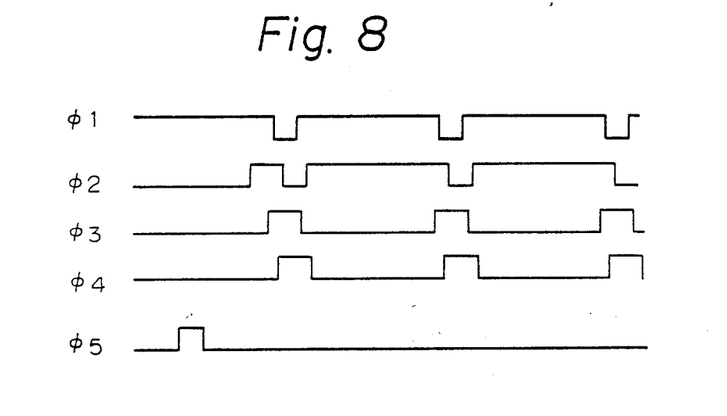
FIG. 8 illustrates an operation of the solidstate image pickup device of FIG. 7.

FIG. 7 shows a portion of the image pickup device 1. Numerals 1, 2, 3 and 4 in a vertical transfer register 41 denote electrodes in one stage of the register. It is evident that the register 41 is a 4-phase register. A photo-sensing unit 42 comprises photo-diodes ①,②,③ and ④ which correspond to the electrodes 1, 2, 3 and 4 of the register 41. A transfer gate 40 transfers the charges stored in the photo-diodes to the register 41 when a pulse $\phi 5$ to be explained later is high level (H). A horizontal transfer register 43 supplies the charge from the vertical transfer register 41 to an amplifier 44 which produces a video signal. ①,②,③ and ④ correspond to A, B, C and D of FIG. 1, respectively. In FIG. 8, $\phi 1$, $\phi 2$, $\phi 3$ and $\phi 4$ correspond to the electrodes 1, 2, 3 and 4 of the vertical transfer register 41, respectively. $\phi 5$ denotes a pulse for driving the transfer gate 40. When $\phi 1$ is H and $\phi 5$ is H, the charge in the photo-diode ① is transferred to the electrode 1 of the vertical transfer register 41, and then it is transferred to the horizontal transfer register 43 by $\phi 1$, $\phi 2$, $\phi 3$ and $\phi 4$.

Figures 9, 10:
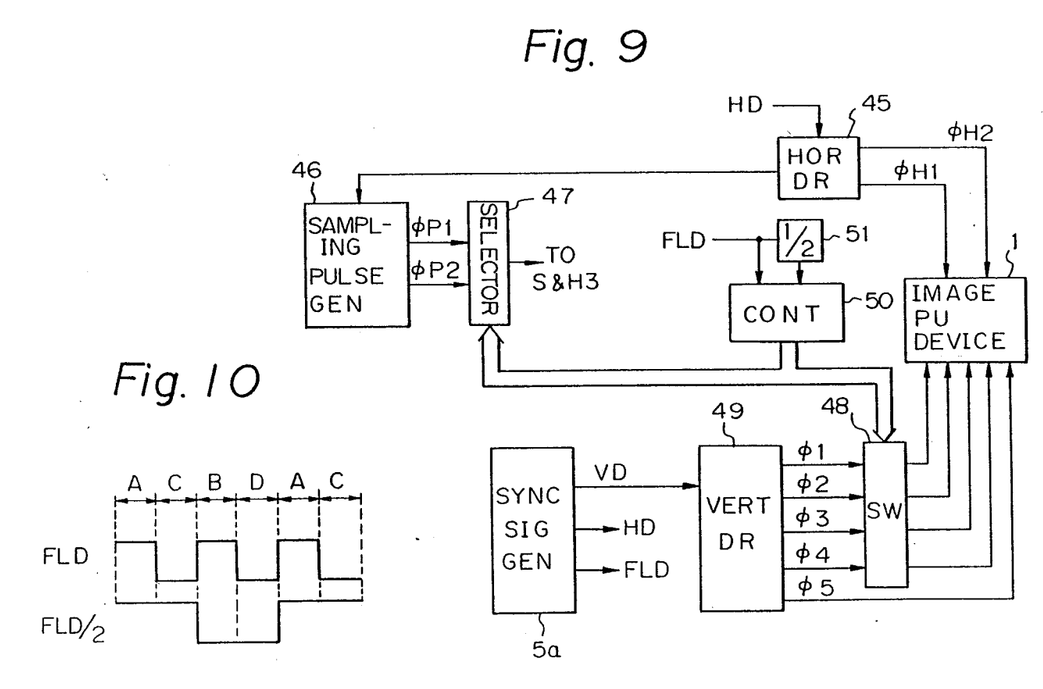
FIG. 9 shows a block diagram of a circuit for controlling drive of the solid-state image pickup device and a sample and hold circuit.
FIG. 10 illustrates an operation of a portion of the circuit of FIG. 9.

FIG. 9 shows circuits for generating the drive pulse for the vertical transfer register 41, the drive pulse for the horizontal transfer register 43 and the sampling pulse for the sample and hold circuit 3. A horizontal drive pulse generator 45 generates the drive pulse for the horizontal transfer register 43 in response to a horizontal synchronization signal HD from the synchronization signal generator 5a shown in FIG. 3. A vertical drive pulse generator 49 generates the drive pulse for the vertical transfer register 41 in response to a vertical synchronization signal VD from the synchronization signal generator 5a shown in FIG. 3. A sampling pulse generator 46 generates sampling pulses $\phi P1$ and $\phi P2$ in response to the drive pulse from the horizontal drive pulse generator 45. A selector 47 selects one of the sampling pulses $\phi P1$ and $\phi P2$ in response to a signal identifying the field (corresponding to A, B, C or D in FIG. 1) supplied by a control circuit 50. A switching circuit 48 selects the electrodes of the vertical transfer register 41 to which the drive pulses $\phi 1$, $\phi 2$, $\phi 3$ and $\phi 4$ are applied, in response to a signal from the control circuit 50. For example, in FIG. 8, $\phi 1$ is applied to the electrode 1 of the register 41 in order to transfer the charge of the photo-diode ① (corresponding to the field A). In order to transfer the charge of the photo-diode ③ (corresponding to the field C), the switching circuit 48 switches the input electrodes for the drive pulses $\phi 1$, $\phi 2$, $\phi 3$ and $\phi 4$ so that $\phi 1$ is applied to the electrode 3 of the register 41, $\phi 2$ is applied to the electrode 4, $\phi 3$ is applied to the electrode 1 and $\phi 4$ is applied to the electrode 2. The selector 47 and switching circuit 48 comprise logic circuits. The control circuit 50 discriminates the fields A, B, C and D in accordance with a field signal FLD from the synchronization signal generator 5a and an output of a ½ frequency divider 51. As shown in FIG. 10, a signal identifying the field is produced based on the levels of the field signal FLD and a ½ frequency signal of the field signal FLD.

Figure 11:
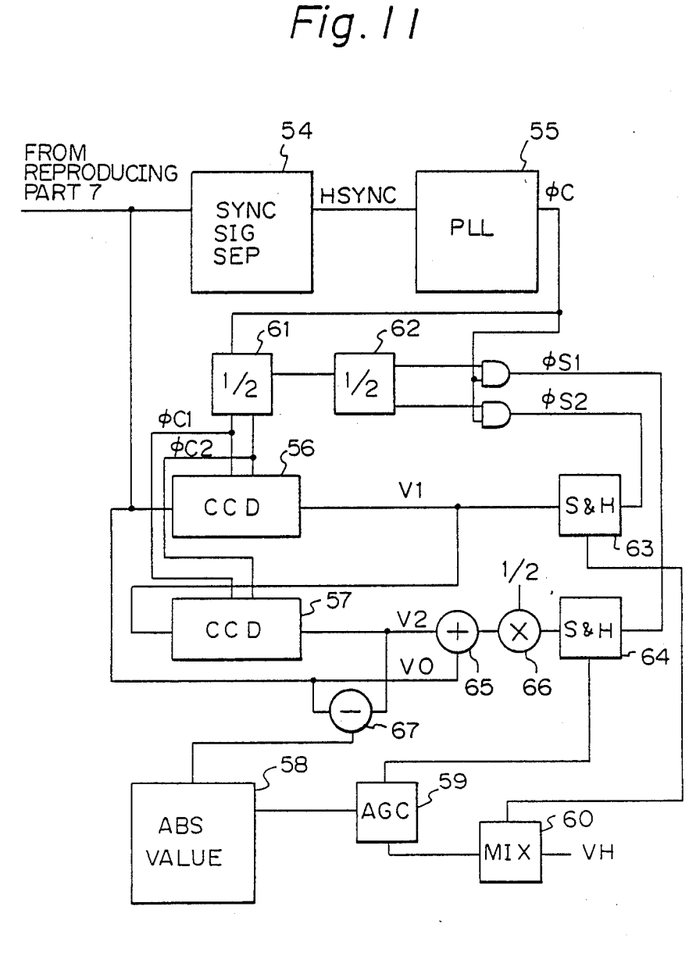
FIGS. 11 and 12 show interpolation circuits of the present invention.

FIG. 11 shows the sample and hold circuit 8 and the interpolation circuit 9 for interpolating the video signal produced by the reproduce unit 7 when the signal has been sampled and recorded as shown in FIG. 2. A synchronization signal separation circuit 54 separates the horizontal synchronization signal HSYNC from one field of video signal supplied from the reproduce unit 7. A PLL circuit 55 generates a pulse $\phi C$ having tetra-frequency based on the horizontal synchronization signal HSYNC. A ½ frequency divider 61 frequency-divides the pulse $\phi C$ by a factor of two to produce two pulses $\phi C1$ and $\phi C2$ of different phases. CCD delay lines 56 and 57 each can store one horizontal scan line of video signal and are driven by the pulses $\phi C1$ and $\phi C2$, respectively. V1 denotes one scan line of video signal produced by the reproduce unit 7 following to V0, and V2 denotes one horizontal scan line of video signal produced by the reproduce unit 7 following V1. The video signals V0 and V2 are summed by an adder 65 and the sum thereof is halved by a multiplier 66, an output of which is supplied to a sample and hold circuit 64. The sample and hold circuits 63 and 64 sample the video signal by $\phi S1$ and $\phi S2$ having a 180° phase difference therebetween and generated by frequency-dividing $\phi C$ by a factor of four. A subtractor 67 calculates a difference between levels of the video signals V0 and V2 for each pixel. An absolute value circuit 58 outputs an absolute value of the difference calculated by the subtractor 67. An auto-gain controller 59 reduces gain when the absolute value is large. A mixing circuit 60 mixes the output of the sample and hold circuit 63 and the output of the sample and hold circuit 64 supplied through the auto-gain controller 59 so that the video signal is interpolated and a high resolution video signal VH is produced.

Figure 12:
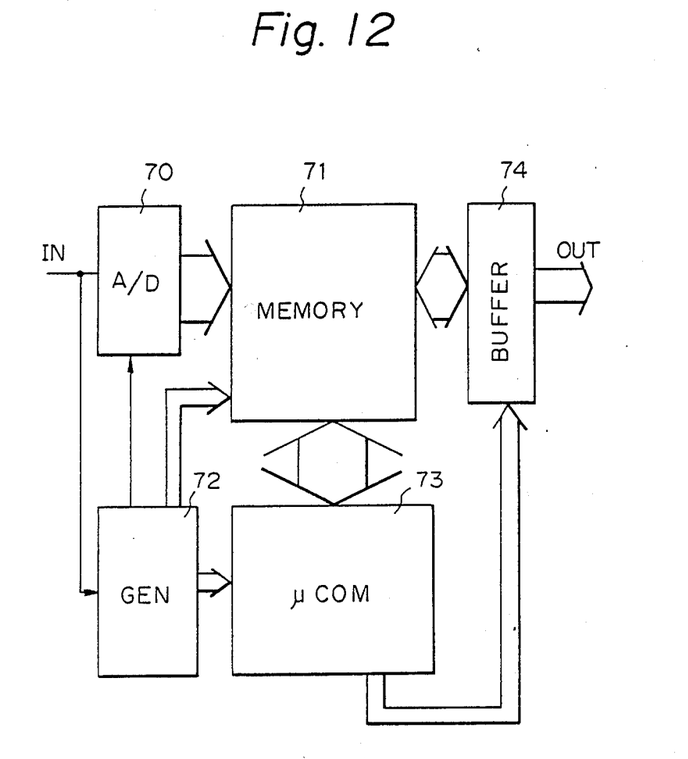

FIG. 12 shows the sample and hold circuit 8 and the interpolation circuit 9 for interpolating the video signal produced by the reproduce unit 7 when the signal has been sampled and recorded as shown in FIG. 1. An A/D converter 70 converts the video signal reproduced by the reproduce unit 7 to a digital signal in synchronism with pulses of different phases in accordance with the corresponding fields (corresponding to the fields A, B, C and D of FIG. 1). The digitized video signal is stored in the corresponding areas of a memory 71 which can store four fields of pixel information. A generator 72 supplies driving signals to A/D converter 70, memory 71 and microcomputer 73 in response to the synchronization signals. The microcomputer 73 interpolates the missing pixels in the field A by the pixels of the fields D and B, the missing pixels in the field B by the pixels of the fields A and C, the missing pixels in the field C by the pixels of the fields B and D, and the missing pixels in the field D by the pixels of the fields C and A. The microcomputer 73 supplies the interpolated video signal to the printer 12 through a buffer 74. When the interpolated video signal is to be supplied to the television monitor 10, the interpolated video signal is converted to an analog signal which is then supplied to the television monitor 10.

What is claimed is:

1. A still picture signal processing apparatus comprising:
   (a) image pickup means having a number of vertical effective pixels that is double the number of effective scan lines in a broadcast television;
   (b) processing means for reading a still picture signal, including first, second, third and fourth fields, from said image pickup means at a horizontal scan frequency of the broadcast television with a 4-to-1 interlace, two of said fields constituting a first frame of a broadcast television signal and the remaining fields constituting a second frame of said broadcast television signal, said processing means sampling said still picture signal with a number of samples that is half the number of effective horizontal pixels of said image pickup means, horizontal scan lines of said first, third, second and fourth fields being positioned in a vertical direction in that order, said processing means sampling said still picture signal so that sampling points of successive horizontal scan lines in each of said fields are phase-reversed;
   (c) recording means for recording said still picture signal on a magnetic disk; and
   (d) reproducing means for reproducing at least one frame of said still picture signal recorded on said magnetic disk.

2. A still picture signal processing apparatus comprising:
   (a) image pickup means having a number of vertical effective pixels that is double the number of effective scan lines in a broadcast television;
   (b) processing means for reading a still picture signal, including first, second, third and fourth fields, from said image pickup means at a horizontal scan frequency of the broadcast television with a 4-to-1 interlace, two of said fields constituting a first frame of a broadcast television signal and the remaining fields constituting a second frame of said broadcast television signal, said processing means sampling said still picture signal with a number of samples that is half the number of effective horizontal pixels of said image pickup means, horizontal scan lines of said first, third, second and fourth fields being positioned in a vertical direction in that order, said processing means sampling said still picture signal so that sampling points of said third and fourth fields are 180° phase shifted from sampling points of said first and second fields;
   (c) recording means for recording said still picture signal on a magnetic disk; and
   (d) reproducing means for reproducing at least one frame of said still picture signal recorded on said magnetic disk.

3. A still picture signal processing apparatus comprising:
   (a) image pickup means having a number of vertical effective pixels that is double the number of effective scan lines in a broadcast television;
   (b) processing means for reading a still picture signal, including first, second, third and fourth fields, from said image pickup means at a horizontal scan frequency of the broadcast television with a 4-to-1 interlace, two of said fields constituting a first frame of a broadcast television signal and the remaining fields constituting a second frame of said broadcast television signal, said processing means sampling said still picture signal with a number of samples that is half the number of effective horizontal pixels of said image pickup means, horizontal scan lines of said first, third, second and fourth fields being positioned in a vertical direction in that order;

(c) recording means for recording said still picture signal on a recording medium;
(d) monitor means; and
(e) reproducing means for reproducing at least one frame of said still picture signal recorded on said recording medium, and causing said monitor means to visualize said at least one frame of said still picture signal.

4. A still picture signal processing apparatus according to claim 3, wherein said processing means produces a still picture signal which has a luminance signal and two color differential signals, and wherein said processing means has means for line-sequencing said two color differential signals so that the sequence of line-sequencing corresponding to said first and second fields is reversed with respect to the sequence of line-sequencing corresponding to said third and fourth fields.

5. A still picture signal processing apparatus according to claim 3, wherein said image pickup means has a single plate coloring plate which includes yellow transmissive filters, magenta transmissive filters, cyan transmissive filters and green transmissive filters, disposed horizontally and vertically in predetermined sequences.

6. A still picture signal processing apparatus according to claim 3, wherein said processing means samples said still picture signal so that sampling points of successive horizontal scan lines in each of said fields are phase-reversed.

7. A still picture signal processing apparatus according to claim 6, wherein said reproducing means has interpolating means for interpolating a second one of three succeeding horizontal scan lines of said four fields corresponding to a still picture signal reproduced from said recording medium on the basis of the remainder of said three succeeding horizontal scan lines.

8. A still picture signal processing apparatus according to claim 5, wherein said interpolating means has means for storing said remainder of said three succeeding horizontal scan lines.

9. A still picture signal processing apparatus according to claim 3, wherein said processing means samples said still picture signal so that sampling points of said third and fourth fields are 180° phase shifted from sampling points of said first and second fields.

10. A still picture signal processing apparatus according to claim 9, wherein said reproducing means has interpolating means for interpolating one horizontal scan line corresponding to one of said four fields of a still picture signal reproduced from said recording medium, on the basis of two horizontal scan lines of the remainder of said four fields of said still picture signal reproduced from said recording medium.

11. A still picture signal processing apparatus according to claim 10, wherein said interpolating means has means for storing four fields of said still picture signal reproduced from said recording medium.

* * * * *